United States Patent Office 2,787,751
Patented Apr. 2, 1957

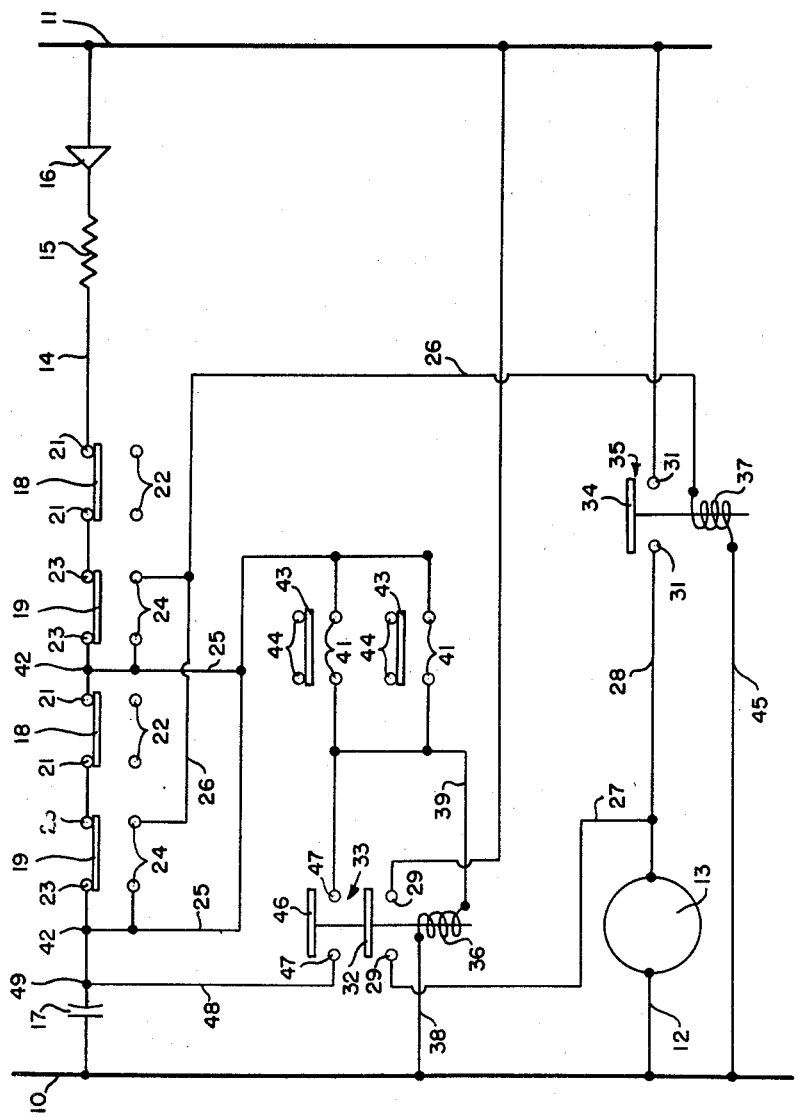

2,787,751

MOTOR JOGGING CONTROL

John T. Davidson, Dayton, Ohio, assignor to The Standard Register Company, Dayton, Ohio, a corporation of Ohio Application March 2, 1953, Serial No. 339,770

10 Claims. (Cl. 318—443)

This invention relates to electrical motor operated circuits and particularly to jogging controls in such circuits.

While not so limited, the invention has especial application to roll imprinters in which it is necessary to make a substitution of type elements, and other adjustments of impression, registration and the like. It is desirable, therefore, that the mechanism, or motor which powers the mechanism, be susceptible of movement in slight repetitive increments so that the parts to be adjusted can be brought to the most easily accessible position. To actuate the motor in such movements is termed jogging.

Jogging controls have heretofore been known but, as known, have been in such integrated relation to the main running controls as to lead to misoperation which can be dangerous in the servicing or adjustment of the machine.

The object of the invention is to simplify the construction as well as the means and mode of operation of motor jogging controls whereby such controls may not only be economicaly produced, but will be more efficient, safe, and satisfactory in use, adaptable to a wide variety of applications, having relatively few parts and be unlikely to get out of repair.

An object of the instant invention is to retain a substantially integrated relation of the running and jogging circuits while providing for separation of controls so that it is impossible to effect running of the machine by operation of the jogging control, or during such operation.

Another object of the invention is to provide a jogging mechanism capable of imparting only one increment of movement to the motor upon each actuation of the jogging control.

A further object of the invention is to provide a generally new form of jogging mechanism utilizing a separable relay and means operable to energize such relay only in conjunction with the opening of the circuit from the main power source.

Still another object of the invention is to utilize a single main control circuit in connection with the running and jogging controls with provisions being made for duplicate controls and for the operation of such controls independently of one another.

A further object of the invention is to provide a motor jogging control possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

The drawing is a diagram of an electrical motor operating circuit in accordance with the illustrative embodiment of the invention.

Referring thereto, lines 10 and 11 extend from a suitable source of electrical current, the former being directly connected by a lead 12 to one side of the motor 13. The lines 10 and 11 are interconnected by a conductor 14 which may be said to comprise the control circuit. In the conductor 14 is a current limiting resistor 15 and a selenium rectifier 16 arranged for flow from the line 11 to the line 10. Also in the conductor 14 is a capacitor 17 charged by flow, as described, from the line 11 to the line 10.

Further interposed in the conductor 14, and in advance of the capacitor 17 in reference to the direction of current flow, is a series of switches made up of duplicate stop switches 18 and duplicate jogging switches 19, the purpose of the duplicate showing being merely to indicate that the several motor controls may be duplicated on or about the machine for convenience of accessibility. Each switch 18 normally engages a pair of contacts 21 in the conductor 14 and is movable therefrom into engagement with a pair of open contacts 22. Each switch 19 normally engages a pair of contacts 23 in the conductor 14 and is movable therefrom into engagement with a pair of contacts 24, one of which is connected to a conductor 25 and the other of which is connected to a conductor 26. The several switches thus normally occupy a closed position in the conductor 14 so that a circuit between the lines 10 and 11 through the conductor 14 normally closed and the capacitor is under continuous charge.

The opposite side of the motor 13 is connected by parallel conductors 27 and 28 to the line 11. The conductor 27 includes spaced apart contacts 29, while the conductor 28 includes spaced apart contacts 31. The contacts 29 are arranged to be bridged by a switch 32 which is part of a relay 33. The contacts 31 are arranged to be bridged by a switch 34 which is part of a relay 35. The relays 33 and 35 are normally open and are closed by energizing respective coils 36 and 37.

One end of the coil 36 is directly connected by a lead 38 to the line 10. The other end thereof is connected by a lead 39, having spaced apart contacts 41 (in duplicate), to the aforementioned conductor 25 which is attached to duplicate terminals 42 located in the conductor 14 intermediate the capacitor 17 and the respective jogging switches 19. Each pair of contacts 41 is arranged to be bridged by a starting or running switch 43 which normally occupies a seated position on open contacts 44 and is depressible into bridging relation to the contacts 41.

The coil 37 is directly connected at its one end by a lead 45 with the line 10. The other end thereof is connected to the aforementioned conductor 26.

In connection with the starting or running control, there is provided a holding circuit which includes a switch 46 forming a part of the relay 33 and connected to and movable with the switch element 32. The switch 46 occupies a normally open relation to a pair of contacts 47, in a lead 48 connected at its one end to the lead 39 and attached at its other end to a terminal 49 in the conductor 14, and bridges such contacts when depressed.

With general reference to the operation of the system, since the relays 33 and 35 are normally open the motor 13 is normally disconnected from the power source. If running switch 43 is depressed to bridge the contacts 41 then a circuit is closed through the coil 36, such circuit extending from line 10 by way of lead 38 from line 11 by way of conductor 14, terminals 42, conductor 25 and lead 39. Energizing of coil 36 draws switch 32 to a bridging position on contacts 29 with the result that a circuit is closed through the motor 13 by way of lead 12 and conductor 27. The motor 13 accordingly commences to operate. Also in response to energizing of the coil 36 the switch element 46 is drawn down upon contacts 47 with the result that a holding circuit is closed through the coil 36 by way of conductor 14, lead 48 and leads 39 and 38. The motor 13 thus will be continued in operation once switch 43 has been depressed, whether or not the switch 43 is released.

To stop the running of the motor one of the stop switches 18 is depressed. As noted this has the effect of opening the circuit through conductor 14 and hence also opens the circuit through lead 48 and conductor 25.

If either jogging switch 19 is depressed the circuit through the conductor 14 is opened and it is accordingly impossible to start the motor through actuation of starting switch 43. As a second function of depression of the switch 19 the contacts 24 are bridged with the result that a circuit is closed from capacitor element 17, conductor 26, through the coil 37 to line 10. Electrical energy stored in the capacitor is discharged or released to the coil 37 along this circuit, energizing the coil and drawing switch 34 down upon the contacts 31. A circuit through the motor 13 accoringly is closed by way of conductor 28 and an operation of the motor results. The period of energization is brief, an exact duration being predetermined by selection of a capacitor of the desired value. Upon full discharge of the capacitor, coil 37 is de-energized whereupon the switch 34 opens the conductor 28 and rotation of the motor stops. Release of the switch 19 re-closes the circuit through conductor 14 and restores the capacitor from a discharging to a charging status.

It will be understood that by repeatedly depressing and releasing the switch 19 the coil 37 may in the above manner be alternately energized and deenergized and intermittent operational impulses so transmitted to the motor 13.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. An electrical motor operating circuit, the combination of an electric motor, a normally closed control circuit including a device for the storing of electrical energy, a relay closing a circuit through said motor, means opening said normally closed control circuit, and a circuit from said device through said relay closed by operation of said last named means for the release of energy from said device to said relay.

2. In an electrical motor operating circuit, the combination of an electric motor, a running control for said motor including a switch and a relay energized by closing of said switch closing a circuit through said motor, and a jogging control for said motor including a normally charged capacitor element, another relay closing a circuit through said motor, and another switch releasing energy from said capacitor element to said relay.

3. In an electrical motor operating circuit, the combination of an electric motor, a normally closed control circuit including a capacitor element, a relay closing a circuit through said motor, and switch means in said control circuit operable concomitantly to open said control circuit and to close a circuit from said capacitor element through said delay.

4. In an electrical motor operating circuit, the combination of an electric motor, a normally closed control circuit including a capacitor element, a pair of independently operable relays having a control circuit, each relay effective when energized to close a circuit through said electric motor, normally open connections in said control circuit energizing said relays, switch means closing one of the relay normally open connections to effect running of the motor, and other switch means concomitantly closing the other one of said normally open connections and opening said control circuit for jogging of said motor by electrical energy released from said capacitor element.

5. An electrical motor operating circuit according to claim 4 characterized by still other switch means opening said control circuit independently of said other switch means.

6. In an electrical motor operating circuit, the combination of an electric motor, a normally closed control circuit including a capacitor element, a pair of independent relays each operable when energized to close a circuit through said electric motor, motor start means energizing one of said relays, a holding circuit connected in said control circuit closed by energizing said one relay maintaining said relay energized for continuous running of the motor, a stop switch opening said control circuit and thereby disabling said holding circuit, a normally open energizing circuit for the other one of said relays having a connection to said control circuit, and a jogging switch in said control circuit operable concomitantly to open said control circuit and to close said energizing circuit, said energizing circuit being connected in said control circuit between said capacitor element and said jogging switch to conduct released energy from said capacitor element.

7. An electrical motor operating circuit, including an electric motor, a source of electric current, a capacitor element positioned to be charged by current from said source, a relay energized by current from said source for closing a circuit through said motor, another relay energized by current from said capacitor element for closing a circuit through said motor, a switch opening and closing a circuit through said first relay and another switch opening and closing a circuit through said other relay.

8. An electrical motor operating circuit according to claim 7, characterized in that said other switch is arranged to open the circuit through said first relay in conjunction with its movement to close the circuit through said other relay.

9. An electrical motor operating circuit, including an electric motor, a source of electric current, parallel leads from said source, a conductor interconnecting said leads, a capacitor element in said condenser arranged to be charged by current flow through the conductor, a pair of normally closed switch elements in series relation in said conductor and in advance of said capacitor element in relation to the direction of current flow, one of said elements being the stop control and the other the jogging control, a pair of other conductors interconnecting said leads and each including said electric motor, a normally open control switch in each of said other conductors, means for closing one of said normally open switches, and means for closing the other of said normally open switches in response to movement of said jogging control to open position in the first said conductor, said last named means comprising a normally open relay circuit connected on opposite sides of said capacitor element and closed by the described movement of said jogging control.

10. An electrical motor operating circuit, according to claim 9, characterized in that said means for closing said one normally open switch comprises a relay circuit and a normally open running switch therein, said circuit being connected on opposite sides of said capacitor element in position to be opened by opening movement of either said stop control or said jogging control.

References Cited in the file of this patent

UNITED STATES PATENTS

| | | |
|---|---|---|
| 1,591,415 | Brown | July 6, 1926 |
| 1,775,730 | McNicol | Sept. 16, 1930 |
| 2,519,216 | Armstrong | Aug. 15, 1950 |
| 2,686,895 | Feldhausen | Aug. 17, 1954 |